United States Patent
Gane et al.

(10) Patent No.: US 9,512,316 B2
(45) Date of Patent: Dec. 6, 2016

(54) METHOD FOR SIZING OF MINERAL MATTER IN THE PRESENCE OF ADDITIVES CONTAINING GLYCEROL, PRODUCTS OBTAINED AND THEIR USES

(75) Inventors: Patrick A. C. Gane, Rothrist (CH); Matthias Buri, Rothrist (CH)

(73) Assignee: Omya International AG, Oftringen (CH)

( * ) Notice: Subject to any disclaimer, the term of this patent is extended or adjusted under 35 U.S.C. 154(b) by 717 days.

(21) Appl. No.: 13/513,229

(22) PCT Filed: Dec. 1, 2010

(86) PCT No.: PCT/IB2010/003084
§ 371 (c)(1),
(2), (4) Date: Jun. 1, 2012

(87) PCT Pub. No.: WO2011/070418
PCT Pub. Date: Jun. 16, 2011

(65) Prior Publication Data
US 2012/0237433 A1    Sep. 20, 2012

Related U.S. Application Data

(60) Provisional application No. 61/284,226, filed on Dec. 15, 2009.

(30) Foreign Application Priority Data

Dec. 7, 2009 (EP) ................................. 09015129

(51) Int. Cl.
| | | |
|---|---|---|
| *B02C 23/00* | (2006.01) | |
| *C09C 1/02* | (2006.01) | |
| *B02C 23/16* | (2006.01) | |
| *B02C 23/06* | (2006.01) | |
| *B03B 1/04* | (2006.01) | |
| *C09C 1/36* | (2006.01) | |
| *C09C 1/40* | (2006.01) | |

(52) U.S. Cl.
CPC ............. *C09C 1/021* (2013.01); *B02C 23/06* (2013.01); *B02C 23/16* (2013.01); *B03B 1/04* (2013.01); *C09C 1/36* (2013.01); *C09C 1/3669* (2013.01); *C09C 1/407* (2013.01); *B02C 23/00* (2013.01); *C01P 2004/61* (2013.01); *C01P 2004/62* (2013.01); *C01P 2006/12* (2013.01)

(58) Field of Classification Search
CPC ........... B02C 23/00; B02C 23/06; B02C 23/16
USPC ........................................ 241/21, 22, 29, 19
See application file for complete search history.

(56) References Cited

U.S. PATENT DOCUMENTS

| | | |
|---|---|---|
| 4,204,877 A | 5/1980 | Moorer et al. |
| 6,039,775 A | 3/2000 | Ho et al. |
| 2006/0272554 A1 | 12/2006 | Jardine et al. |
| 2010/0222484 A1 | 9/2010 | Buri et al. |

FOREIGN PATENT DOCUMENTS

| | | |
|---|---|---|
| EP | 0510890 A2 | 10/1992 |
| FR | 2896171 A1 | 7/2007 |
| JP | H06271835 A | 9/1994 |
| WO | 2005063399 A1 | 7/2005 |
| WO | 2006100510 A1 | 9/2006 |
| WO | 2007109328 A2 | 9/2007 |

OTHER PUBLICATIONS

The Written Opinion for PCT Application No. PCT/IB2010/003084.
The Extended European Search Report dated May 21, 2010 for European Application No. EP 09015129.1.
The Opposition dated Jan. 31, 2014 for European Patent No. 2 330 162 B1.
Wikipedia Article: Glycerol.
Wikipedia Article: Calcium Carbonate.
The International Search Report dated Mar. 2, 2011 for PCT Application No. PCT/IB2010/003084.

*Primary Examiner* — Faye Francis

(74) *Attorney, Agent, or Firm* — Amter, Rothstein & Ebenstein LLP

(57) ABSTRACT

The present invention concerns a method for sizing of mineral matter using a sizing aid additive including glycerol and/or at least one polyglycerol allowing the efficiency of air sizing to be increased, or involving a specific sizing energy which is reduced relative to an additive-free air sizing, whilst obtaining a sized mineral matter compatible with an application in an aqueous medium.

47 Claims, No Drawings

METHOD FOR SIZING OF MINERAL MATTER IN THE PRESENCE OF ADDITIVES CONTAINING GLYCEROL, PRODUCTS OBTAINED AND THEIR USES

CROSS REFERENCE TO RELATED APPLICATIONS

This application is a U.S. National phase of PCT Application No. PCT/IB2010/003084, filed Dec. 1, 2010, which claims priority to European Application No. 09 015 129.1, filed Dec. 7, 2009 and U.S. Provisional Application No. 61/284,226,filed Dec. 15, 2009.

The mineral industry is a large consumer of chemicals. They are used in the various steps of transformation/modification/processing to which mineral matter is subject. A step of classifying of mineral matter according to the size of the particles, which partly depends on the degree of dispersion of the mineral matter in a gaseous medium, and of which natural calcium carbonate represents a special example, due to its multiple uses, constitutes one of these steps.

The skilled man in the art responsible for implementing a step of sizing of mineral matter in an air classifier is aware that ineffective sizing substantially reduces the productivity of its overall method. Notably, when the particles to be sized are fine, of the order of one micron, these particles tend to combine in the hydrophobic environment represented by air, thus forming agglomerates. There is a risk that such agglomerates may be sized with particles of size equivalent to the size of the agglomerate, and not with the particles of size equivalent to the primary particles forming the agglomerate. The skilled man in the art is still therefore seeking additives which can increase the sizing efficacy, notably by preventing the phenomenon of agglomeration, whilst allowing the use of the sized product in various environments such as, for example, hydrophilic environments.

U.S. Pat. No. 6,139,960 makes reference to a method of manufacture of fly ash, involving a step of sizing in an air classifier, where the fine fly ash of average diameter between 0.1 and 5 microns are able to be preprocessed by a silane, a stearate, an aluminate, an titanate or an zirconate.

Since such additives confer hydrophobic properties, they do not represent a solution for the skilled man in the art who is seeking an additive which allows, following the sizing step, the use of the sized material in an aqueous environment.

In addition, in the thesis entitled "Dispergierung von feinen Partikelfraktionen in Gasströmungen-Einfluss von Dispergierbeanspruchung und oberflächenmodifizierenden Zusätzen" by Sabine Niedballa (1999, Fakultät für Maschinenbau, Verfahrens-und Energietechnik der Technischen Universität Bergakademie Freiberg), it is observed that in the case of primary particles with a diameter of less than one micrometre additives of the fatty acid type do not influence the degree of dispersion of fine calcium carbonate particles in air.

Faced with this problem, and in a surprising manner, the Applicant was able to identify a method of sizing of mineral matter which satisfies these various requirements of the skilled man in the art, i.e. increases the efficacy of air sizing, or which implies a specific sizing energy which is lower relative to an air sizing without additives, whilst obtaining a sized mineral matter compatible with an application in an aqueous medium.

This method consists of a method of sizing of mineral matter, characterised in that the said method implements the following steps:

a) supply at least one mineral matter comprising dolomite, or talc, or titanium dioxide, or alumina, or kaolin, or calcium carbonate, or their blends;
b) supply at least one sizing aid additive comprising glycerol and/or at least one polyglycerol, in an aqueous or pure form;
c) bring into contact, once or several times, the mineral matter from step a) with the sizing aid additive of step b) in one or more dry grinding and/or dry blending steps;
d) undertake at least one dry sizing step of the mineral matter obtained in step c) in a gaseous environment, in order to obtain at least two fractions of particles of different average particle sizes;
e) possibly repeat steps c) and/or d) on all or part of the sized mineral matter resulting from step d).

The term "specific sizing" signifies the total quantity of energy expressed in kWh required to size a tonne of dry calcium carbonate.

Glycerol is known as a sizing additive, as disclosed in the thesis entitled "Understanding of the physical and chemical mechanisms occurring during dry grinding of calcium carbonate in the presence of a grinding agent" by Mathieu Skrzypczak (Ecole Centrale de Lyon, 2009). And, as demonstrated in the examples below, it is revealed that grinding agents typically used in the mining industry, such as polyethylene glycol (PEG), lead to ineffective sizing. In addition, this thesis indicates that the dry grinding of fine particles, of 0 to 10 μm, in the presence of glycerol, is ineffective (according to Figure IV-4), which also suggests to the skilled man in the art that there is little interaction between the glycerol and the fine particles. Nothing therefore led the skilled man in the art responsible for selecting a sizing aid agent to seek a solution from among the grinding aid agents, and notably from among the ineffective grinding aid agents.

A first object of the present invention lies in a method for sizing of mineral matter, characterised in that the said method implements the following steps:

a) supply at least one mineral matter comprising dolomite, or talc, or titanium dioxide, or alumina, or kaolin, or calcium carbonate, or their blends;
b) supply at least one sizing aid additive
  (i) consisting of glycerol, in an aqueous or pure form, or
  (ii) consisting of glycerol with one or more of the following agents: ethylene glycol, monopropylene glycol, triethylene glycol, an inorganic acid or an inorganic acid salt, formic or citric acid or a formic or citric acid salt, an organic polyacid or an organic polyacid salt, an alcanolamine, a poly(ethylene imine), a polyalkylene glycol polymer of molecular mass by weight of between 200 g/mole and 20,000 g/mole, preferentially between 600 g/mole and 6,000 g/mole, a carbohydrate having a root mean square of the radius of gyration equal to or less than the modal radius of the mineral matter, one or more polyglycerols, where the said agent or agents are in the aqueous or pure form, or
  (iii) comprising one or more polyglycerols in the absence of glycerol.
c) bring into contact, once or several times, the mineral matter from step a) with the sizing aid additive of step b) in one or more dry grinding and/or dry blending steps;
d) undertake at least one sizing step of the mineral matter obtained in step c) in a gaseous environment, in order to obtain at least two fractions of particles of different average particle sizes;
e) possibly repeat steps c) and/or d) on all or part of the sized mineral matter resulting from step d).

In a preferential variant, this method is characterised in that the average particle sizes of the said fractions of particles obtained in step d) differ by at least 0.1 μm relative to one another.

In another preferential variant, this method is characterised in that when the fractions are obtained in step d) the average particle sizes of the said fractions have a ratio of 1:1.05 to 1:150, and preferentially 1:1.1 to 1:1.15.

This method may take the form of 6 variants, according to the form and nature of the additive:
- first variant: glycerol in the pure form
- second variant: glycerol in an aqueous formulation
- third variant: glycerol in combination with at least one of the compounds set out in point (ii), in the aqueous or pure form
- fourth variant: at least one polyglycerol
- fifth variant: at least one polyglycerol in the pure form
- sixth variant: at least one polyglycerol in an aqueous formulation.

According to this first variant the said additive consists of glycerol in the pure form.

In the second variant, the said additive consists of water and glycerol. According to this second variant, when the said additive consists of water and glycerol, it contains preferentially 25% to 95%, more preferentially 45% to 90%, and very preferentially 75% to 85%, by weight of glycerol relative to their total weight, the remainder consisting of water.

In the third variant, the said additive consists of glycerol with one or more of the following agents: ethylene glycol, monopropylene glycol, triethylene glycol, an inorganic acid or an inorganic acid salt, formic or citric acid or a formic or citric acid salt, an organic polyacid or an organic polyacid salt, an alcanolamine, a poly(ethylene imine), a polyalkylene glycol polymer of molecular mass by weight of between 200 g/mole and 20,000 g/mole, preferentially between 600 g/mole and 6,000 g/mole, a carbohydrate having a root mean square of the radius of gyration equal to or less than the modal radius of the mineral matter, one or more polyglycerols, where the said agent or agents are in the aqueous or pure form.

According to this third variant, the said inorganic acid is preferentially a phosphoric acid.

According to this third variant, the said inorganic acid is preferentially a mono-, di- or tri-alkaline salt, and is preferentially a salt of a cation of Group I or II of the Periodic Table of the Elements.

According to this third variant, the said formic or citric acid salt is preferentially a mono-, di- or tri-alkaline salt, and is more preferentially a salt of a cation of Group I or II of the Periodic Table of the Elements.

According to this third variant, the said organic polyacid preferentially has the formula COOH—$(CH_2)_n$—COOH, in which n is an integer having a value of between 0 and 7, inclusive, or is a mono- or di-alkaline salt of the organic polyacid of formula COOH—$(CH_2)n$—COOH, in which n is equal to an integer having a value of between 0 and 7 inclusive, or is a polymeric organic polyacid of one or more of the following monomers, in the acid form, or partially or fully neutralised with one or more cations of Group I or II of the Periodic Table of the Elements: acrylic, methacrylic, maleic or itaconic, and is preferentially an oxalic acid, a pimelic acid or an adipic acid.

According to this third variant, the said alcanolamine is chosen from among 2-amino-2-methyl-1-propanol, 2-amino-2-ethyl-1,3-propanediol, tri-ethanolamine, N-butyldiethanolamine and tri-iso-propanolamine, whether or not neutralised, and is more preferentially chosen from among their forms which are neutralised by means of a formic or citric acid salt, or of an organic polyacid salt according to claim 10.

According to this third variant, the said polyalkylene glycol polymer is preferentially a polyethylene glycol, a polypropylene glycol, or an ethylene-propylene glycol copolymer, whether random or block.

According to this third variant, the said carbohydrate having a root mean square of the radius of gyration of the said carbohydrate equal to or less than the modal radius of the mineral matter is preferentially glucose, fructose, sucrose, starch or cellulose, and is more preferentially sucrose.

According to this third variant, the polyglycerol or polyglycerols are preferentially chosen from among di-glycerol, tri-glycerol, tetra-glycerol, penta-glycerol, hexa-glycerol, hepta-glycerol, octa-glycerol, nona-glycerol and deca-glycerol and their blends, and more preferentially from among di- and tri-glycerol.

According to this third variant, the said additive preferentially contains 20% to 95% by weight of glycerol, 1% to 50% by weight of the said agent and 0% to 65% by weight of water, more preferentially 30% to 90% by weight of glycerol, 10% to 45% by weight of the said agent and 0% to 60% by weight of water, and very preferentially 35% to 75% by weight of glycerol, 30% to 40% by weight of the said agent and 5% to 50% by weight of water, relative to their total weight, where the sum of the percentages by weight of glycerol, of the said agent and of water are, in each case, equal to 100%.

In the fourth variant, the said additive comprises one or more polyglycerols in the absence of glycerol.

This polyglycerol or these polyglycerols are preferentially chosen from among di-glycerol, tri-glycerol, tetra-glycerol, penta-glycerol, hexa-glycerol, hepta-glycerol, octa-glycerol, nona-glycerol and deca-glycerol and their blends, and more preferentially from among di- and tri-glycerol.

In the fifth variant, the said additive consists of one or more polyglycerols in the pure form.

In the sixth variant, the said additive consists of water and one or more polyglycerols. According to this sixth variant, the said additive preferentially contains 25% to 95%, more preferentially 45% to 90%, and very preferentially 75% to 85%, by weight of polyglycerols relative to their total weight, the remainder consisting of water.

In the method of the invention, it is preferential to use 100 to 5,000 ppm, more preferentially 500 to 3,000 ppm of glycerol or polyglycerol, relative to the dry weight of the said mineral matter.

In another variant of the method according to the invention, it is preferential to use between 0.1 and 1 mg, and more preferentially between 0.2 and 0.6 mg, total dry equivalent, of the said glycerol or of the said polyglycerol and every possible agent for each $m^2$ of mineral matter.

The said mineral matter used in the method of the invention preferentially has an average diameter, measured by a Sedigraph™ 5100, of between 0.5 and 500 μm, more preferentially between 1 μm and 45 μm, and even more preferentially between 1 μm and 10 μm, at the supply of the air classifier in step d).

The said mineral matter used in the method of the invention preferentially has a percentage by weight of particles having a diameter of less than 2 μm, measured by a Sedigraph™ 5100, of between 5% and 90%, and more preferentially between 10% and 60% at the supply of the air classifier in step d).

The said mineral matter of step a) is preferentially a calcium carbonate, and more preferentially a natural calcium carbonate.

The said air sizing of step d) of the method according to the invention is preferentially a sizing using a sieve and/or a cyclone device.

Step d) may comprise at least two steps of sizings undertaken in series or in parallel, and preferentially comprises three to ten sizing steps.

The method of the invention is preferentially a continuous method.

The invention also lies in a product obtained by the method of the invention. Such a product can advantageously be used in paint, plastic, food applications destined for human or animal consumption, pharmaceutical formulation, in paper pulp or in paper coating.

EXAMPLES

Example 1

This example concerns an air sizing of a natural calcium carbonate which is a Carrara marble. The additive described in Table 2 is used in a prior grinding step.

The distribution of the particle sizes of the initial calcium carbonate fed into the grinder, obtained by pre-grinding in a hammer mill, is given in table 1.

TABLE 1

| Diameter of particles (mm) | % by mass |
|---|---|
| 4-2.5 | 7.25 |
| 2.5-1.6 | 9.73 |
| 1.6-0.8 | 11.44 |
| 0.8-0.5 | 5.57 |
| 0.5-0.2 | 23.73 |
| 0.2-0.1 | 23.18 |
| <0.1 | 19.1 |

The Carrara marble was introduced into a ball-mill of capacity 5.7 $m^3$ using 8 tonnes of Cylpeb™ iron grinding beads, in the form of cylinders, having an average diameter of 16 mm, with a view to obtaining a ground material:
having a median diameter less than or equal to 1.8 µm, 55% by weight of the particles of which have a diameter of less than or equal to 2 µm.

The dry grinding is undertaken continuously.

When it leaves the grinding chamber the ground material is conveyed to a classifier of the SELEX™ 6S type. Its rotational speed and its air flow rate are set respectively at 5,200 revolutions/min. and 6,000 $m^3$/h, so as to select that portion of particles having an average diameter less than or equal to a given value, and which will constitute the finished product; the portion of remaining particles having an average diameter greater than this value is reintroduced into the ball-mill.

The grinding is undertaken in such a way that the selector's feed rate is always equal to 4 tonnes/h, and that the quantity of fresh product injected into the ball-mill matches the quantity of selected product leaving the system.

The dry sizing aid agents were introduced into the grinding system in the area of the point where the fresh material is introduced, in such a way as to maintain a constant quantity of grinding aid agent relative to the fresh material introduced for grinding.

TABLE 2

| | Test n° | | |
|---|---|---|---|
| | 1 Prior art | 2 Invention | 3 Invention |
| Type of agent | PEG | Glycerol | Glycerol + H3PO4 |
| Specific sizing energy (kWh/t) | 172 | 160 | 171 |
| % of particles of diameter <2 µm | 57 | 57 | 58 |
| % of particles of diameter <1 µm | 21 | 23 | 23 |
| d50 (µm) | 1.8 | 1.7 | 1.7 |
| BET specific area ($m^2$/g) | 6.9 | 6.9 | 7.2 |
| Specific sizing energy per $m^2$ of product (kWh/(t · $m^2$)) | 24.9 | 23.2 | 23.7 |

The agents referenced PEG consist of an aqueous solution containing 75% (by mass) of polyethylene glycol of molecular mass by weight equal to 600 g/mole and were obtained from the company FLUKA™.

Glycerol designates an aqueous solution containing 75% (by mass) of glycerol.

Glycerol+H3PO4 designates an aqueous solution containing 75% (by mass) of a blend (99/1 by mass) of glycerol/phosphoric acid.

Each of the tests uses 2,000 ppm of active product (or 2,667 ppm of each aqueous solution).

Concerning the level of sizing performance, it is observed that the best results are obtained for tests 2 and 3.

The invention claimed is:

1. A method of sizing of mineral matter comprising the following steps:
    a) supplying at least one mineral matter comprising dolomite, or talc, or titanium dioxide, or alumina, or kaolin, or calcium carbonate, or any blend thereof;
    b) supplying at least one sizing aid additive:
        (i) consisting of glycerol, in an aqueous or pure form; or
        (ii) consisting of glycerol with one or more of the following agents: ethylene glycol, monopropylene glycol, triethylene glycol, an inorganic acid or an inorganic acid salt, formic or citric acid or a formic or citric acid salt, an organic polyacid or an organic polyacid salt, an alcanolamine, a poly(ethylene imine), a polyalkylene glycol polymer of molecular mass by weight of between 200 g/mole and 20,000 g/mole, a polyalkylene glycol polymer of molecular mass by weight of between 600 g/mole and 6,000 g/mole, a carbohydrate having a root mean square of the radius of gyration equal to or less than the modal radius of the mineral matter, one or more polyglycerols, wherein the agent or agents are in the aqueous or pure form, or
        (iii) comprising one or more polyglycerols in the absence of glycerol;
    c) bringing into contact, once or several times, the mineral matter from step a) with the sizing aid additive of step b) in one or more dry grinding and/or dry blending steps;
    d) undertaking at least one sizing step of the mineral matter obtained in step c) in a gaseous environment, in order to obtain at least two fractions of particles of different average particle sizes; and e) optionally repeating steps c) and/or d) on all or part of the sized mineral matter resulting from step d).

2. The method according to claim 1, wherein the average particle sizes of the fractions of particles obtained in step d) differ by at least 0.1 µm relative to one another.

3. The method according to claim 1, wherein when two fractions are obtained in step d) the average particle sizes of the fractions have a ratio of 1:1.05 to 1:150.

4. The method according to claim 1, wherein when two fractions are obtained in step d) the average particle sizes of the fractions have a ratio of 1:1.1 to 1:1.15.

5. The method according to claim 1, wherein the sizing additive consists of glycerol in pure form or an aqueous form of water and glycerol.

6. The method according to claim 5, wherein the additive consists of water and glycerol containing 25% to 95% by weight of glycerol relative to total weight of water and glycerol.

7. The method according to claim 5, wherein the additive consists of water and glycerol containing 45% to 90% by weight of glycerol relative to total weight of water and glycerol.

8. The method according to claim 5, wherein the additive consists of water and glycerol containing 75% to 85% by weight of glycerol relative to total weight of water and glycerol.

9. The method according to claim 1, wherein the additive consists of glycerol with one or more of the following agents: ethylene glycol, monopropylene glycol, triethylene glycol, an inorganic acid or an inorganic acid salt, formic or citric acid or a formic or citric acid salt, an organic polyacid or an organic polyacid salt, an alcanolamine, a poly(ethylene imine), a polyalkylene glycol polymer of molecular mass by weight of between 200 g/mole and 20,000 g/mole, a polyalkylene glycol polymer of molecular mass by weight of between 600 g/mole and 6,000 g/mole, a carbohydrate having a root mean square of the radius of gyration equal to or less than the modal radius of the mineral matter, one or more polyglycerols, wherein the agent or agents are in the aqueous or pure form.

10. The method according to claim 1, wherein the additive consists of glycerol with a polyalkylene glycol polymer of molecular mass by weight of between 200 g/mole and 20,000 g/mole.

11. The method according to claim 1, wherein the additive consists of glycerol with a polyalkylene glycol polymer of molecular mass by weight of between 600 g/mole and 6,000 g/mole.

12. The method according to claim 9, wherein the agent is an inorganic acid that is a phosphoric acid.

13. The method according to claim 9, wherein the agent is an inorganic salt that is a mono-, di- or tri-alkaline salt, or a salt of a cation of Group I or II of the Periodic Table of the Elements.

14. The method according to claim 9, wherein the agent is a salt of formic or citric acid that is a mono-, di- or tri-alkaline salt, or a salt of a cation of Group I or II of the Periodic Table of the Elements.

15. The method according to claim 9, wherein the agent is an organic polyacid having the formula COOH—$(CH_2)_n$—COOH, wherein n is an integer having a value of between 0 and 7, inclusive, or a mono- or di-alkaline salt of an organic polyacid of formula COOH—$(CH_2)$n-COOH, in which n is equal to an integer having a value of between 0 and 7 inclusive, or a polymeric organic polyacid of one or more of the following monomers, in the acid form, or in the form which is partially or fully neutralised with one or more cations of Group I or II of the Periodic Table of the Elements: acrylic, methacrylic, maleic or itaconic.

16. The method according to claim 9, wherein the agent is an oxalic acid, a pimelic acid or an adipic acid.

17. The method according to claim 9, wherein the agent is a alcanolamine chosen from among 2-amino-2-methyl-1-propanol, 2-amino-2-ethyl-1,3-propanediol, tri-ethanolamine, N -butyldiethanolamine and tri-iso-propanolamine, whether or not neutralized, or is chosen from among their forms which are neutralised by means of a formic or citric acid salt, or of an organic polyacid salt.

18. The method according to claim 9, wherein the agent is a polyalkylene glycol polymer that is a polyethylene glycol, a polypropylene glycol, or an ethylene-propylene glycol copolymer, whether random or block.

19. The method according to claim 9, wherein the agent is a carbohydrate having a root mean square of the radius of gyration of the carbohydrate equal to or less than the modal radius of the mineral matter, and wherein the carbohydrate is glucose, fructose, sucrose, starch or cellulose.

20. The method according to claim 9, wherein the agent is a carbohydrate having a root mean square of the radius of gyration of the carbohydrate equal to or less than the modal radius of the mineral matter, and wherein the carbohydrate is sucrose.

21. The method according to claim 9, wherein the agent is a polyglycerol or polyglycerols chosen from among di-glycerol, tri-glycerol, tetra-glycerol, penta-glycerol, hexa-glycerol, hepta-glycerol, octa-glycerol, nona-glycerol and deca-glycerol, or any blend thereof.

22. The method according to claim 9, wherein the agent is a polyglycerol or polyglycerols chosen from among di-glycerol and tri-glycerol.

23. The method according to claim 9, wherein the additive contains 20% to 95% by weight of glycerol, 1% to 50% by weight of the agent and 0% to 65% by weight of water, relative to their total weight, wherein the sum of percentages by weight of glycerol, the agent and of water are equal to 100%.

24. The method according to claim 9, wherein the additive contains 30% to 90% by weight of glycerol, 10% to 45% by weight of the agent and 0% to 60% by weight of water, relative to their total weight, wherein the sum of percentages by weight of glycerol, the agent and of water are equal to 100%.

25. The method according to claim 9, wherein the additive contains 35% to 75% by weight of glycerol, 30% to 40% by weight of the agent and 5% to 50% by weight of water, relative to their total weight, wherein the sum of percentages by weight of glycerol, the agent and of water are equal to 100%.

26. The method according to claim 1, wherein the additive comprises one or more polyglycerols in the absence of glycerol.

27. The method according to claim 26, wherein the polyglycerol or polyglycerols are chosen from among di-glycerol, tri-glycerol, tetra-glycerol, penta-glycerol, hexa-glycerol, hepta-glycerol, octa-glycerol, nona-glycerol and deca-glycerol, or any blend thereof.

28. The method according to claim 26, wherein the polyglycerol or polyglycerols are chosen from among di-glycerol and tri-glycerol.

29. The method according to claim 26, wherein the additive consists of one or more polyglycerols in pure form.

30. The method according to claim 26, wherein the additive consists of water and one or more polyglycerols.

31. The method according to claim 30, wherein the additive contains 25% to 95% by weight of polyglycerols relative to their total weight, the remainder consisting of water.

32. The method according to claim 30, wherein the additive contains 45% to 90% by weight of polyglycerols relative to their total weight, the remainder consisting of water.

33. The method according to claim 30, wherein the additive contains 75% to 85% by weight of polyglycerols relative to their total weight, the remainder consisting of water.

34. The method according to claim 1, wherein the mineral matter is contacted with an additive that includes 100 to 5,000 ppm of glycerol or polyglycerol, relative to the dry weight of the mineral matter.

35. The method according to claim 1, wherein the mineral matter is contacted with the additive that includes 500 to 3,000 ppm of glycerol or polyglycerol, relative to the dry weight of the mineral matter.

36. The method according to claim 1, wherein the mineral matter is contacted with 0.1 to 1 mg of the additive for each $m^2$ of mineral matter.

37. The method according to claim 1, wherein the mineral matter is contacted with 0.2 to 0.6 mg of the additive for each $m^2$ of mineral matter.

38. The method according to claim 1, wherein the mineral matter has an average diameter, measured by a Sedigraph™ 5100, to 500 μm, at the supply of the air classifier in step d).

39. The method according to claim 1, wherein the mineral matter has an average diameter, measured by a Sedigraph™ 5100, of 1 to 45 μm, at the supply of the air classifier in step d).

40. The method according to claim 1, wherein the mineral matter has an average diameter, measured by a Sedigraph™ 5100, of 1 to 10 μm, at the supply of the air classifier in step d).

41. The method according to claim 1, wherein the mineral matter has a percentage by weight of particles having a diameter of less than 2 μm, measured by a Sedigraph™ 5100, of between 5% and 90%, at the supply of the air classifier in step d).

42. The method according to claim 1, wherein the mineral matter has a percentage by weight of particles having a diameter of less than 2 μm, measured by a Sedigraph™ 5100, of between 10% and 60%, at the supply of the air classifier in step d).

43. The method according to claim 1, wherein the mineral matter of step a) is a calcium carbonate.

44. The method according to claim 1, wherein the mineral matter of step a) is a natural calcium carbonate.

45. The method according to claim 1, wherein step d) of air sizing is a sizing using a sieve and/or a cyclone device.

46. The method according to claim 1, wherein step d) comprises at least two steps of sizing undertaken in series or in parallel.

47. The method according to claim 1, wherein step d) comprises three to ten steps of sizing undertaken in series or in parallel.

* * * * *